(12) United States Patent
Sadler et al.

(10) Patent No.: US 11,346,234 B2
(45) Date of Patent: May 31, 2022

(54) TURBINE VANE ASSEMBLY INCORPORATING CERAMIC MATRIX COMPOSITE MATERIALS

(71) Applicant: Rolls-Royce plc, London (GB)

(72) Inventors: Keith Sadler, London (GB); Michael J. Whittle, London (GB)

(73) Assignee: Rolls-Royce plc, London (GB)

( * ) Notice: Subject to any disclaimer, the term of this patent is extended or adjusted under 35 U.S.C. 154(b) by 241 days.

(21) Appl. No.: 16/732,960

(22) Filed: Jan. 2, 2020

(65) Prior Publication Data

US 2021/0207486 A1 Jul. 8, 2021

(51) Int. Cl.

| | | |
|---|---|---|
| *F01D 11/00* | (2006.01) | |
| *F01D 5/28* | (2006.01) | |
| *F01D 25/24* | (2006.01) | |
| *F01D 25/28* | (2006.01) | |
| *F01D 9/04* | (2006.01) | |

(52) U.S. Cl.
CPC ............ *F01D 5/284* (2013.01); *F01D 9/042* (2013.01); *F01D 11/005* (2013.01); *F01D 25/24* (2013.01); *F01D 25/28* (2013.01); *F05D 2220/323* (2013.01); *F05D 2230/60* (2013.01); *F05D 2240/12* (2013.01); *F05D 2240/35* (2013.01); *F05D 2240/55* (2013.01); *F05D 2260/202* (2013.01); *F05D 2300/6033* (2013.01)

(58) Field of Classification Search
CPC .......... F01D 25/24; F01D 25/28; F01D 9/042; F01D 11/00; F01D 11/005; F05D 2240/55
See application file for complete search history.

(56) References Cited

U.S. PATENT DOCUMENTS

| | | |
|---|---|---|
| 6,887,040 B2 | 5/2005 | Tiemann et al. |
| 7,094,026 B2 | 8/2006 | Coign et al. |
| 7,824,152 B2 * | 11/2010 | Morrison ................ F01D 9/042 415/135 |
| 8,070,427 B2 | 12/2011 | Snook et al. |
| 8,356,981 B2 | 1/2013 | Cooke et al. |
| 9,546,557 B2 | 1/2017 | Grooms, III et al. |
| 9,863,259 B2 | 1/2018 | Boeke et al. |
| 10,113,436 B2 | 10/2018 | Rioux et al. |
| 10,180,073 B2 | 1/2019 | Tuertscher et al. |
| 10,329,937 B2 | 6/2019 | Boeke et al. |
| 10,774,665 B2 * | 9/2020 | Greene ................ F01D 11/005 |
| 11,162,368 B2 * | 11/2021 | Generale ................ F01D 9/041 |
| 2018/0306063 A1 | 10/2018 | Shoemaker et al. |
| 2019/0153883 A1 | 5/2019 | Kim |

FOREIGN PATENT DOCUMENTS

FR 3080145 A1 10/2019

* cited by examiner

*Primary Examiner* — Eldon T Brockman
*Assistant Examiner* — Danielle M. Christensen
(74) *Attorney, Agent, or Firm* — Barnes & Thornburg LLP

(57) ABSTRACT

A turbine vane assembly includes a plurality of turbine vanes, an outer vane support, and an inner vane support. The turbine vanes are adapted to interact with gases flowing through a gas path of the gas turbine engine. The outer vane support is arranged radially outward of the turbine vane and configured to receive aerodynamic loads from the turbine vanes. The inner vane support is arranged radially inward from the outer vane support to locate the turbine vane assembly therebetween.

18 Claims, 8 Drawing Sheets

TURBINE VANE ASSEMBLY INCORPORATING CERAMIC MATRIX COMPOSITE MATERIALS

FIELD OF THE DISCLOSURE

The present disclosure relates generally to gas turbine engines, and more specifically to turbine vane assemblies for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine are conducted toward airfoils included in stationary vanes and rotating blades of the turbine. The airfoils are often made from high-temperature resistant materials and/or are actively cooled by supplying relatively cool air to the vanes and blades due to the high temperatures of the combustion products. To this end, some airfoils for vanes and blades are incorporating composite materials adapted to withstand very high temperatures. Design and manufacture of vanes and blades from composite materials presents challenges because of the geometry and strength desired for the parts.

SUMMARY

The present disclosure may comprise one or more of the following features and combinations thereof.

A turbine vane assembly for use in a gas turbine engine may include a carrier, a vane, and a chordal seal. The carrier may comprise metallic materials and may circumferentially at least partway about an axis. The vane may comprise ceramic matrix composite materials and may be adapted to interact with gases flowing through a gas path of the gas turbine engine. The chordal seal may comprise metallic materials and may be located radially between the carrier and the vane to restrict gas flow between the carrier and the vane In some embodiments, the vane may include an outer platform, an inner platform, an airfoil, and an outer mount. The outer platform may define an outer boundary of the gas path. The inner platform may be spaced apart radially from the outer platform to define an inner boundary of the gas path. The airfoil may extend radially between the outer platform and the inner platform. The outer mount may extend radially away from the outer platform.

In some embodiments, the chordal seal may include a radially upright band, a first arm, and a second arm. The first arm may extend axially forward away from the band and partway around the outer mount of the vane. The second arm may extend axially forward away from the band and partway around the outer mount of the vane opposite the first arm.

In some embodiments, an axially facing surface of the band may engage the carrier and a radially inward facing surface of the band may engage the outer platform along a linear path. The engagement of the band with the carrier and the vane may restrict the gas flow between the carrier and the outer platform of the vane.

In some embodiments, the first arm may engage the outer platform, while the second arm may engage the carrier. The first arm and the second arm may be elastically deformed to urge the band radially inward toward the outer platform and maintain contact of the radially inward facing surface with the outer platform during use of the turbine vane assembly.

In some embodiments, the first arm may include a flange and a plurality of load pads. The flange may extend axially away from the band. The plurality of load pads may extend away from the flange and engage a suction side of the outer mount.

In some embodiments, the band may include a body and a rib. The body may be coupled with the first arm and the second arm. The rib may extend circumferentially along the body and axially outward away from the body to engage the carrier.

In some embodiments, the first arm and the second arm may be shaped to have a contour. The contour may correspond with a contour of the outer mount.

In some embodiments, the outer platform may have a leading edge and a trailing edge. The leading edge may extend circumferentially relative to the axis. The trailing edge may extend circumferentially relative to the axis.

In some embodiments, a radially outward facing surface of the outer platform at the trailing edge may extend circumferentially along a straight path without curving about the axis. The radially inward facing surface of the band may engage the radially outward facing surface at the trailing edge.

In some embodiments, the radially inward facing surface of the band forms a tip. The tip may be located forward of an axial midpoint of the band.

In some embodiments, the turbine vane assembly may further include an inner chordal seal. The inner chordal seal may be arranged radially inward of the vane.

In some embodiments, the inner chordal seal may include a panel and a chordal band. The panel may extend partway about the axis. The chordal band may extend radially outward from the panel and engage the inner platform of the vane along a linear path to restrict the gas flow between the panel and the inner platform of the vane into the interior cavity of the vane.

In some embodiments, the carrier may define a radially inwardly opening channel and a plurality of vent passages. The radially inwardly opening channel may be arranged along a leading edge of the outer platform. The plurality of vent passages may extend radially inwardly and circumferentially through the carrier and open into the radially inwardly opening channel. The plurality of vent passages may cause gas flowing into the channel from the plurality of vent passages to swirl in the channel and ensures an even circumferential pressure distribution which enables a minimum outward to gas path sealing flow.

In some embodiments, the first arm may include an axially extending flange and a first engagement member. The first engagement member may extend radially from the flange.

In some embodiments, the second arm may include an axially extending flange and a second engagement member. The second engagement member may extend radially from the flange.

In some embodiments, the band may extend circumferentially from a first end to a second end. In some embodiments, an imaginary line may extend from the second end of the band to the first engagement member. The second engagement member may be located on the imaginary line.

In some embodiments, the carrier may include an outer wall and a lip. The outer wall may extend circumferentially. The lip may extend radially inward from the outer wall relative to the axis.

In some embodiments, the axially facing surface of the band may engage the lip. The lip may be sized to allow the axially facing surface of the band to slide radially inwardly and outwardly relative to the axis along the lip. The lip may be sized to allow the band to slide relative to the axis to maintain engagement of the band and the lip during use of the turbine vane assembly.

According to another aspect of the present disclosure, a turbine vane assembly for use in a gas turbine engine may include a carrier, a vane, and a chordal seal. The carrier may extend circumferentially at least partway about an axis. The chordal seal may be located radially between the carrier and the vane.

In some embodiments, the vane may include an outer platform, an inner platform, an airfoil, and an outer mount. The inner platform may be spaced apart radially from the outer platform to define a gas path of the gas turbine engine. The airfoil may extend radially between the outer platform and the inner platform. The outer mount may extend radially away from the outer platform.

In some embodiments, the chordal seal may include a band, a first arm, and a second arm. The first arm may extend axially forward away from the band and partway around the outer mount of the vane. The second arm may extend axially forward away from the band and partway around the outer mount of the vane opposite the first arm. In some embodiments, an axially facing surface of the band may engage the carrier and a radially inward facing surface of the band may engage the outer platform along a linear path.

In some embodiments, the first arm may engage the outer platform, while the second arm may engage the carrier. The first arm and the second arm may be elastically deformed to urge the band radially inward toward the outer platform and maintain contact of the radially inward facing surface with the outer platform.

In some embodiments, the band may include a body and a rib. The body may be coupled with the first arm and the second arm. The rib may extend circumferentially along the body and axially outward away from the body to engage the carrier.

In some embodiments, the first arm may include a flange, a first engagement member, and a plurality of load pads. The flange may extend axially away from the band. The first engagement member may extend radially from the flange and engage the outer platform of the vane. The plurality of load pads may extend away from the flange and engage a suction side of the outer mount.

In some embodiments, the second arm may include a flange, and a second engagement member. The flange may extend axially away from the band. The second engagement member may extend radially from the flange and engage the carrier.

In some embodiments, the band may extend circumferentially from a first end to a second end such that an imaginary line extends from the second end of the band to the first engagement member. The second engagement member may be located on the imaginary line.

In some embodiments, the turbine vane assembly may further include an inner chordal seal. The inner chordal seal may be arranged radially inward of the van.

In some embodiments, the inner chordal seal may include a panel and a chordal band. The panel may extend partway about the axis. The chordal band may extend radially outward from the panel and engage the inner platform of the vane along a linear path. The chordal band may engage the inner platform to restrict a gas flow between the panel and the inner platform of the vane into the interior cavity of the vane.

In some embodiments, each of the outer platform and the inner platform may have a leading edge and a trailing edge. The leading edge may extend circumferentially relative to the axis. The trailing edge may extend circumferentially relative to the axis.

In some embodiments, each of the outer platform and the inner platform may include a chordal sealing surface. The chordal sealing surface may be at the trailing edge and may face opposite the gas path. The chordal sealing surface may extend circumferentially along a straight path without curving about the axis.

In some embodiments, the radially inward facing surface of the band may engage the chordal sealing surface of the outer platform. In some embodiments, the chordal band of the inner chordal seal may engage the chordal sealing surface of the inner platform.

According to another aspect of the present disclosure, a method may include several steps. The method may include, providing a carrier, a vane, and a chordal seal.

In some embodiments, the carrier may include a panel and a spar. The panel may extend circumferentially partway about an axis. The spar may extend radially inward from the panel.

In some embodiments, the vane may include an outer platform, an inner platform, an airfoil, and a vane mount. The inner platform may be spaced apart axially from the outer platform relative to the axis. The airfoil may extend axially between and interconnect the outer platform and the inner platform. The vane mount may extend radially away from the outer platform.

In some embodiments, the chordal seal may include a band, a first arm, and a second arm. The first arm may extend axially forward away from the band. The second arm may extend axially forward away from the band.

In some embodiments, the method may further include arranging the chordal seal around the vane mount of the vane. The chordal seal may be arranged around the vane mount so that the first arm of the chordal seal extends around a suction side of the vane mount of the vane and the second arm of the chordal seal extends around a pressure side of the vane mount of the vane.

In some embodiments, the method may further include arranging the spar through an interior cavity that extends radially through the vane to locate the vane mount of the vane radially inward of the carrier and engaging the first arm of the chordal seal with the outer platform of the vane. The first arm may be engaged with the outer platform of the vane to cause the first arm and the second arm to elastically deform and urge the band of the chordal seal radially inward toward engagement with the outer platform.

These and other features of the present disclosure will become more apparent from the following description of the illustrative embodiments.

DETAILED DESCRIPTION OF THE DRAWINGS

Figure 1:
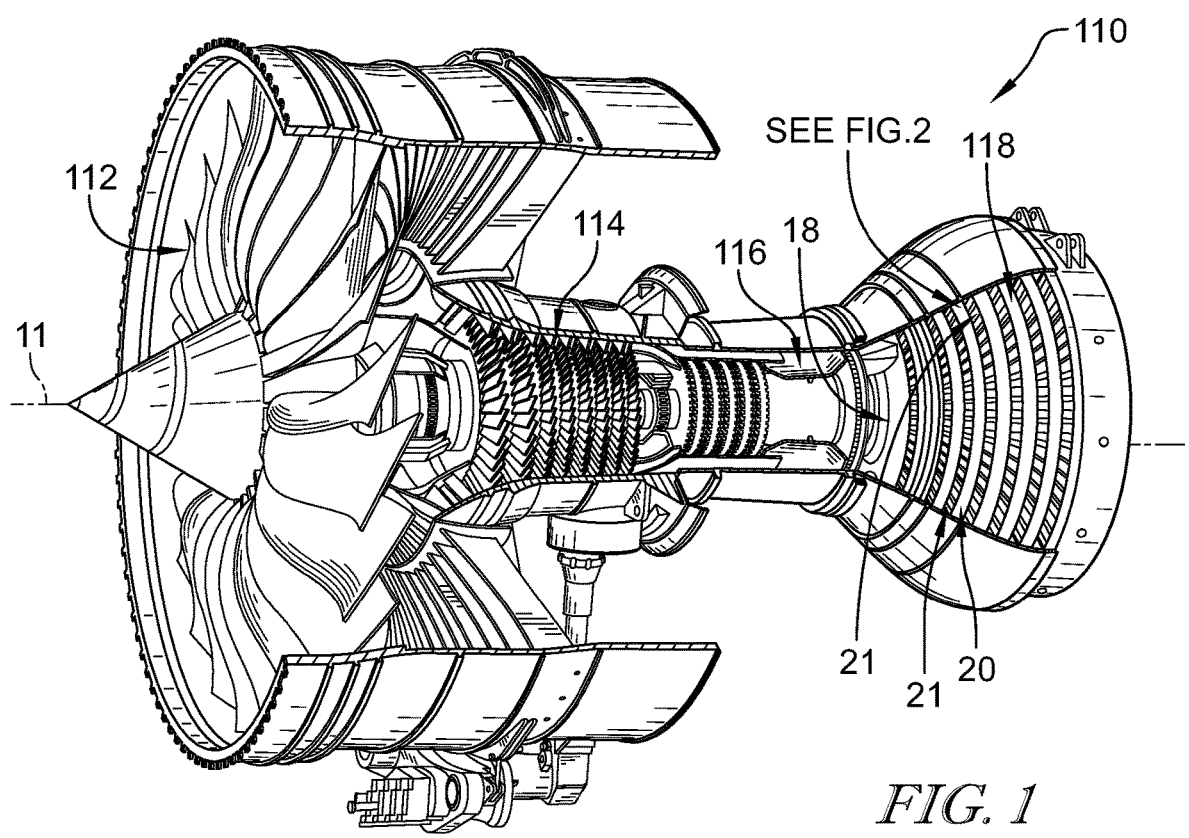
FIG. 1 is a cutaway view of a gas turbine engine that includes a fan, a compressor, a combustor, and a turbine, the turbine including rotating wheel assemblies configured to rotate about an axis of the engine and static turbine vane rings configured to direct air into downstream rotating wheel assemblies.

For the purposes of promoting an understanding of the principles of the disclosure, reference will now be made to a number of illustrative embodiments illustrated in the drawings and specific language will be used to describe the same.

Figure 2:
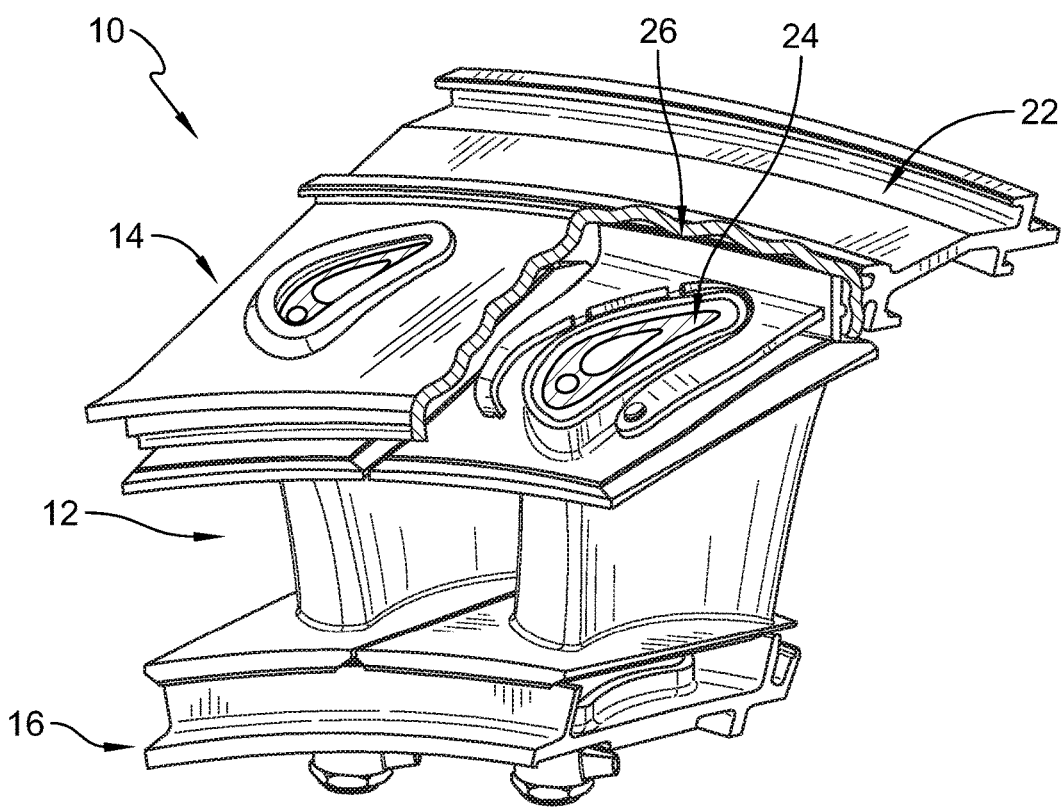
FIG. 2 is a perspective view of a turbine vane assembly of one of the static turbine vane rings of FIG. 1 showing the turbine vane assembly includes turbine vanes adapted to interact with hot gases flowing through a gas path of the gas turbine engine, an outer vane support that extends radially through the turbine vanes to receive force loads from the turbine vanes, and an inner vane support arranged radially inward of the outer vane support and coupled to the outer vane support, and further showing a portion of the outer vane support broken away to show a chordal seal arranged between a carrier of the outer vane support and the turbine vane to restrict air flow therebetween.

A turbine vane assembly 10 for use in a gas turbine engine 110 is shown in FIG. 2. The turbine vane assembly 10 includes a plurality of turbine vanes 12, an outer vane support 14, and an inner vane support 16 as shown in FIGS. 2-3 and 8-10. The turbine vanes 12 interact with hot gases conducted through a gas path 18 of the gas turbine engine 110 and conduct the hot gases around the turbine vane assembly 10 toward a rotating wheel assembly 21 located downstream of the turbine vane assembly 10 as suggested in FIG. 4. The outer vane support 14 is located radially outward of the vanes 12, while the inner vane support 16 is spaced apart radially from the outer vane support 14 relative to an axis 11 of the gas turbine engine 110 to locate the plurality of turbine vanes 12 radially between.

The outer vane support 14 includes a carrier 22, support spars 24, 25, and a chordal seal 26 as shown in FIGS. 2-5 and 8-11. The carrier 22 is arranged radially outward of the turbine vane 12 and extends at least partway circumferentially about the axis 11. Each of the support spars 24, 25 extends radially inward from the carrier 22 through an interior cavity 27 of the corresponding turbine vane 12 and is configured to receive force loads applied to the vane 12 by the hot gases. The chordal seal 26 comprises metallic materials and is located radially between the carrier 22 and one of the plurality of vanes 12 to restrict gas flow between the carrier 22 and the vane 12.

The turbine vane assembly 10 is adapted for use in the gas turbine engine 110, which includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about the axis 11 of the gas turbine engine 110 and drive the compressor 114 and the fan 112.

Figure 4:
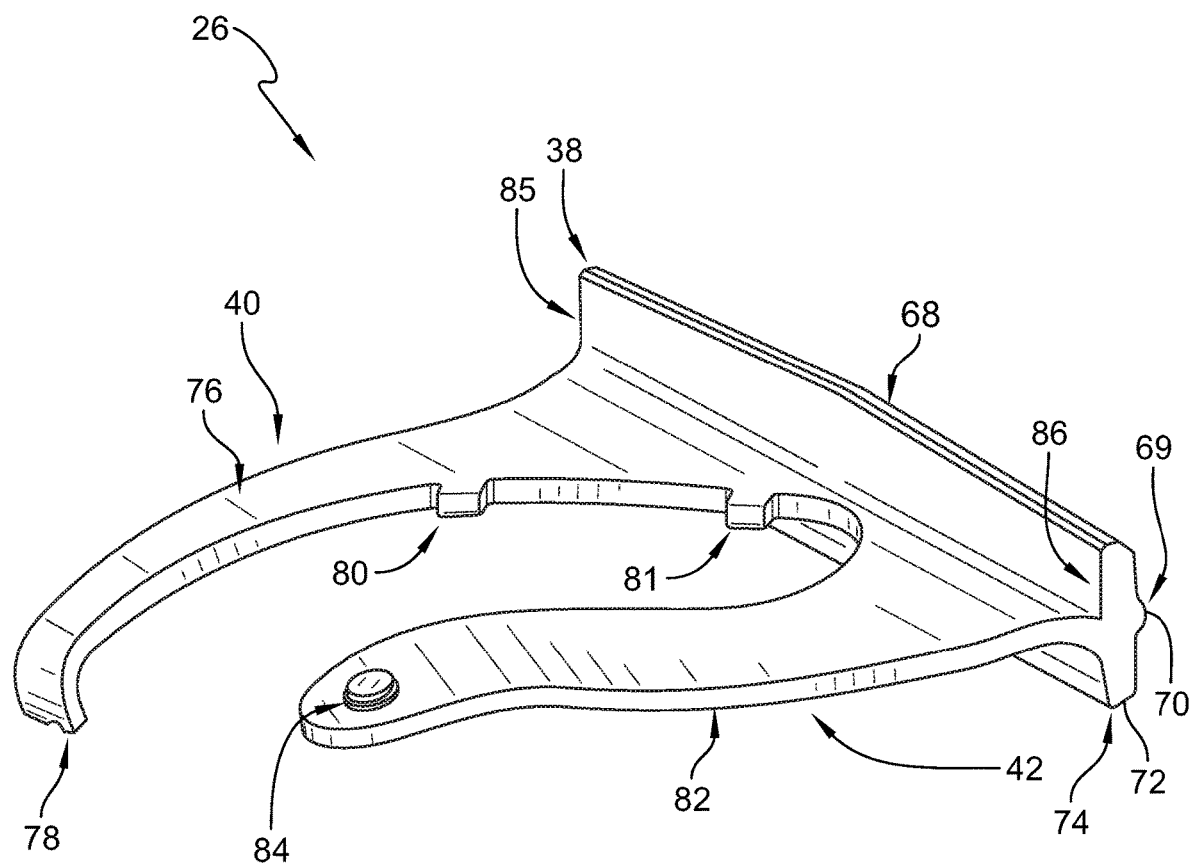
FIG. 4 is a perspective view of the chordal seal of FIG. 3 showing the chordal seal includes a band that extends radially and circumferentially relative to the axis, a first arm that extends axially forward away from the band, and a second arm that extends axially forward away from the band, the first and second arms being configured to deform elastically in the radial direction to urge the chordal seal into engagement with the vane.

The turbine 118 includes a turbine case 19, a plurality of static turbine vane rings 20 that are fixed relative to the axis 11, and a plurality of bladed rotating wheel assemblies 21 as suggested in FIGS. 1 and 4. The outer vane support 14 is coupled to the turbine case 19 in the illustrative embodiment. Each turbine vane ring 20 includes a plurality of turbine vane assemblies 10. The hot gases are conducted through the gas path 18 and interact with the bladed wheel assemblies 21 to cause the bladed wheel assemblies 21 to rotate about the axis 11. The turbine vane rings 20 are positioned to direct the gases toward the bladed wheel assemblies 21 with a desired orientation.

In some embodiments, the turbine vane assembly 10 is pressurized radially inward and outward of the gas path 18 to a uniform static pressure with a flow of sealing fluid or air. The uniform static pressure is often greater than the pressure of the gas path 18 to prevent hot gas ingress radially inward and outward of the gas path 18. The turbine vanes 12 are configured to guide and accelerate the working fluid within the gas path 18 towards the downstream turbine blade 15, causing a reduction in static pressure from a leading edge 28 of the turbine vane 12 to a trailing edge 30 of the turbine vane 12. As such, a pressure gradient between the sealing fluid pressurizing the radially inward and outward cavities 35, 36 of the turbine vane assembly 10 and the working fluid within the gas path 18 increases moving from the leading edge 28 to the trailing edge 30. Therefore, effective sealing at the trailing edge 30 may help minimize leakage and increase engine performance.

In metallic vane embodiments, rigid chordal seals may be used at the trailing edge 30 of the metallic vane to seal the radially inner and outer cavities 35, 36 of the vane from the gas path 18. However, in ceramic matrix composite vane embodiments, the difference in coefficients of thermal expansion between the metallic materials of the vane supports 14, 16 and the ceramic matrix composite materials of the turbine vane 12 may cause relative movement, which may reduce the effectiveness of such a rigid chordal seal at the trailing edge 30.

As such, the present disclosure provides the chordal seal 26 that is configured to deform elastically in response to thermal expansion of the components of the turbine vane assembly 10 to maintain sealing between the carrier 22 and the vane 12. By clamping the vane 12 and the chordal seal 26 between the outer and inner vane supports 14, 16, the chordal seal 26 is able to elastically deform as the temperature changes within the assembly 10. The elastic defamation of the chordal seal 26 maintains a rigid engagement between the chordal seal 26 with the vane 12 throughout the flight cycle of the engine 10, improving sealing, but also minimizing the resulting stresses in the vane 12 as a result of the rigid engagement.

The chordal seal 26 includes a band 38, a first arm 40, and a second arm 42 as shown in FIGS. 2-5. The band 38 engages the carrier 22 and the vane 12 along a linear path. The first arm 40 extends axially forward away from the band 38 and partway around a portion of the vane 12. The second arm 42 extends axially forward away from the band 38 and partway around a portion of the vane 12 opposite the first arm 40. The arms 40, 42 engage the carrier 22 and the vane 12 to urge engagement of the band 38 with the vane 12 to restrict the gas flow between the carrier 22 and the vane 12.

Turning again to the turbine vanes 12, each vane 12 includes an outer platform 44, an inner platform 46, an airfoil 48, an outer mount 50, and an inner mount 52 as shown in FIGS. 2-7. The outer platform 44 defines an outer boundary of the gas path 18, while the inner platform 46 is spaced apart radially from the outer platform 44 to define an inner boundary of the gas path 18. The airfoil 48 extends radially between the outer platform 44 and the inner platform 46 and is configured to guide the hot gases within the gas turbine engine 110 through the gas path 18. The outer mount 50 extends radially away from the outer platform 44, while the inner mount 52 extend radially away from the inner platform 46.

Figure 6:
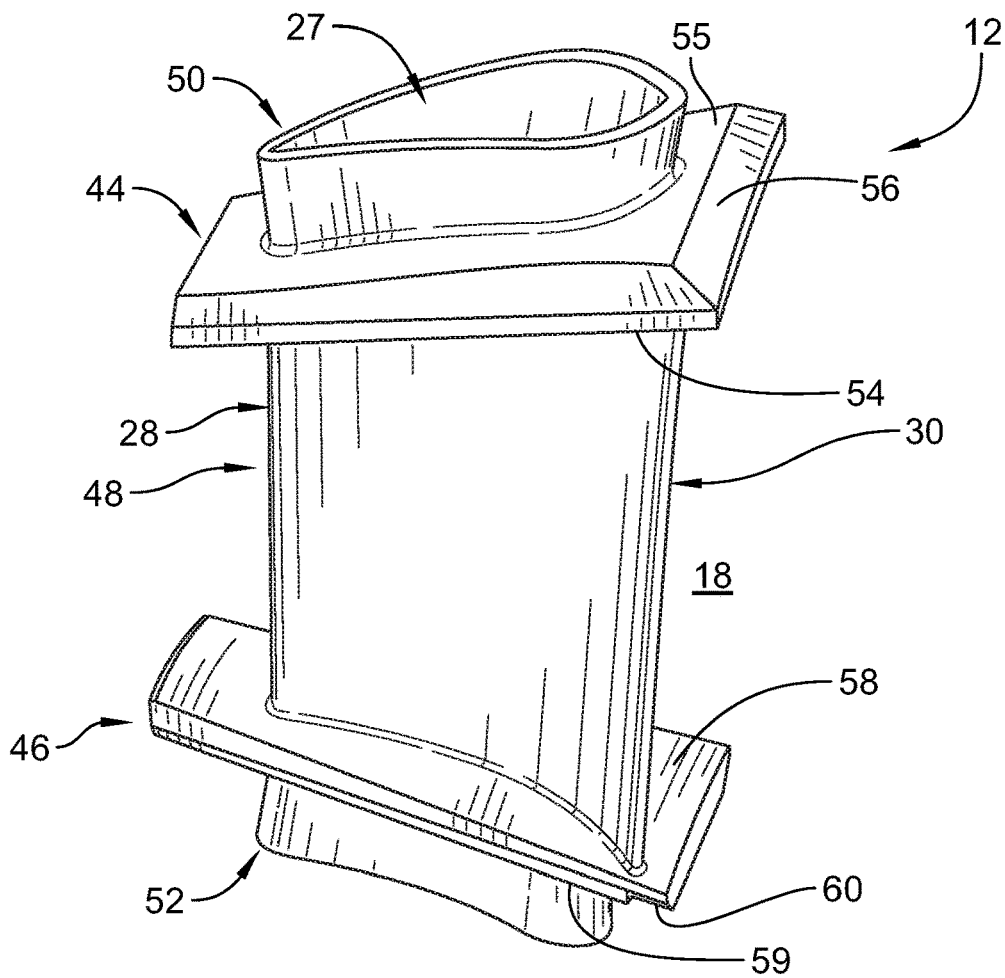
FIG. 6 is a perspective view of the turbine vane included in the turbine vane assembly of FIG. 2 showing the turbine vane assembly further includes an outer platform that defines an outer boundary of the gas path, an inner platform spaced radially inward of the outer platform that defines an inner boundary of the gas path, and an airfoil that extends between the outer platform and the inner platform, and further showing the outer and inner platforms are each shaped to include a linear chordal sealing surface that extends along a straight path and engages with bands of the chordal seals.
Figure 7:
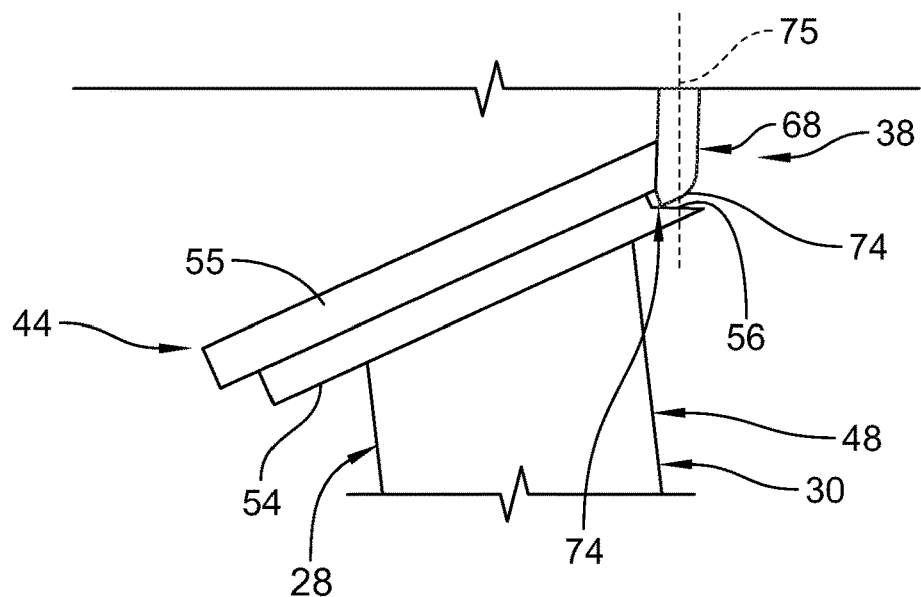
FIG. 7 is an elevation view of the interface between the band of the chordal seal and the chordal sealing surface of the outer platform included in the turbine vane showing the band of the chordal seal forms a tip that engages the chordal sealing surface.

The outer platform 44 includes an inner surface 54, an outer surface 55, and a radially outward facing surface 56, or otherwise referred to as an outer chordal sealing surface 56 as shown in FIGS. 6 and 7. The inner surface 54 faces the gas path 18 to form an outer gas path surface for the outer boundary of the gas path 18. The outer surface 55 faces radially outward opposite the gas path 18. The chordal sealing surface 56 is arranged at the trailing edge 30 of the outer platform 44 and extends circumferentially along a straight path without curving about the axis 11.

In the illustrative embodiment, the inner and outer surfaces 54, 55 follow the curvature of the engine 110 so that the outer platform 44 extends at least partway about the axis 11, while the chordal sealing surface 56 is flat (i.e. does not follow the curvature of the engine 110). The band 38 engages the chordal sealing surface 56 at the trailing edge 30 in the illustrative embodiment. The flat chordal sealing surface 56 increases the sealing effectiveness along the trailing edge 30 of the outer platform 44.

In the illustrative embodiment, the outer chordal sealing surface 56 is machined into the outer surface 55 of the outer platform 44. In some embodiments, the trailing edge 30 of the outer platform 44 is thickened before the chordal sealing surface 56 is machined so that the thickness at the midline of the outer platform 44 is not compromised.

In the illustrative embodiment, the band 38 extends radially and circumferentially relative to the axis 11 and engages the outer chordal sealing surface 56 of the outer platform 44. The first arm 40 extends axially forward away from the band 38 and partway around a suction side 32 of the outer mount 50 of the vane 12. The second arm 42 extends axially forward away from the band 38 and partway around a pressure side 34 of the outer mount 50 of the vane 12 opposite the first arm 40.

The inner platform 46 includes an inner surface 58, an outer surface 59, and a radially inward facing surface 60, or otherwise referred to as an inner chordal sealing surface 60 as shown in FIG. 6. The inner surface 58 faces the gas path 18 to form an inner gas path surface for the inner boundary of the gas path 18. The outer surface 59 faces radially inward opposite the gas path 18. The inner chordal sealing surface 60 is arranged at the trailing edge 30 of the inner platform 46 and extends circumferentially along a straight path without curving about the axis 11. The inner and outer surfaces 58, 59 follow the curvature of the engine 110 so that the inner platform 46 extends at least partway about the axis 11, while the inner chordal sealing surface 60 is flat (i.e. does not follow the curvature of the engine 110 around the axis 11).

The carrier 22 includes an outer wall 62, a lip 63, and a plurality of vent passages 64 as shown in FIGS. 3 and 8-11. The outer wall 62 extends circumferentially partway about the axis 11. The lip 63 extends radially inward from the outer wall 62 relative to the axis 11. In the illustrative embodiment, the outer wall 62 and the lip 63 of the carrier 22 define a cavity 66 that is sized to receive a portion of the chordal seal 26.

Figure 9:
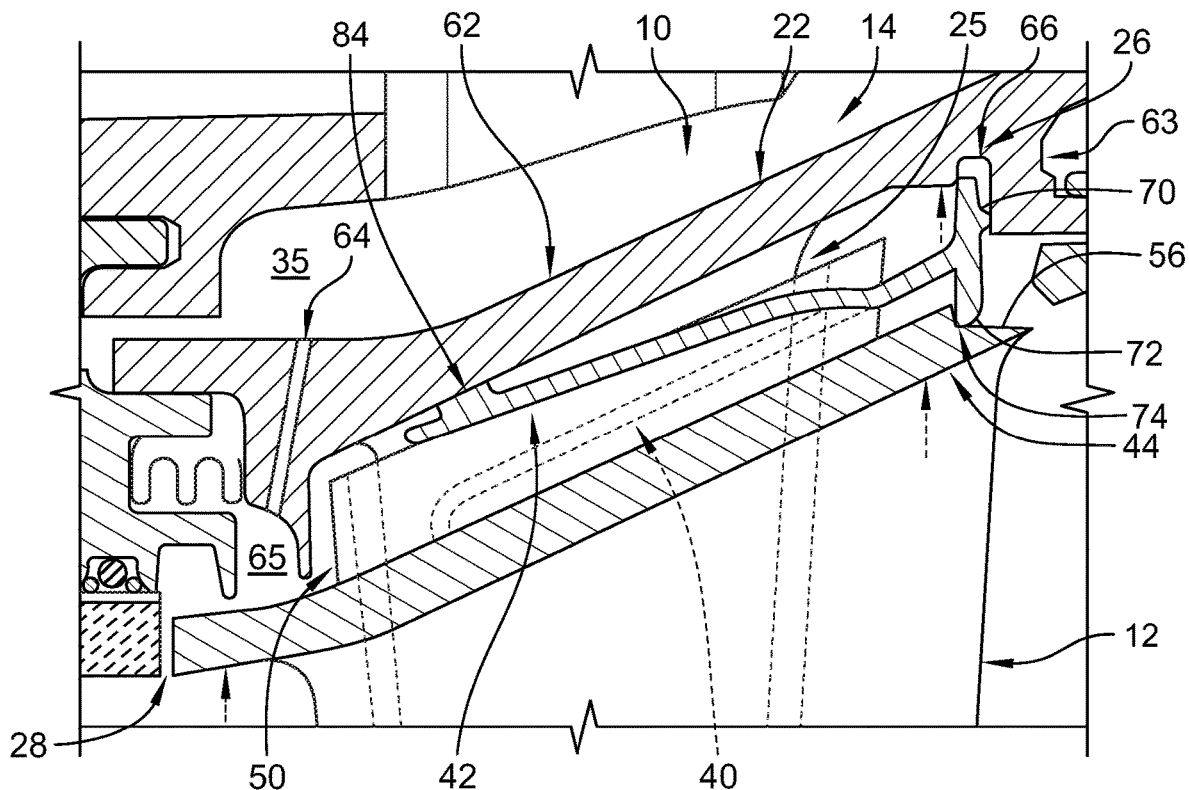
FIG. 9 is a detail view of the turbine vane assembly of FIG. 8 showing the chordal seal arranged between the outer carrier and the outer platform of the turbine vane at cold build and suggesting the chordal seal is configured to deform elastically to allow the band to remain engaged with the outer platform in response to thermal growth of the components.
Figure 10:
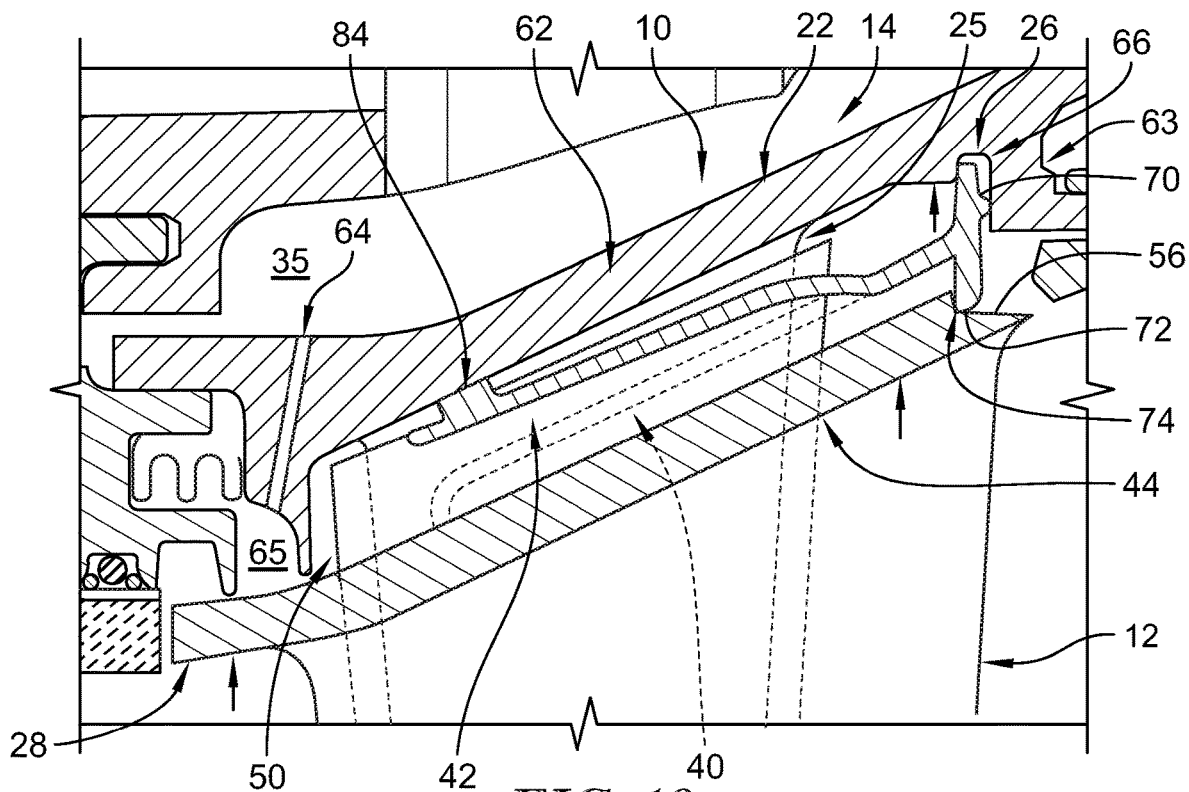
FIG. 10 is a detail view similar to FIG. 9 showing relative thermal growth between the outer vane support and the turbine vane causing the first and second arms to deform and maintain engagement of the band with the outer platform of the vane.

In the illustrative embodiment, the plurality of vent passages 64 extends radially inwardly and circumferentially through the carrier 22 and open into a radially inwardly opening channel 65 at the leading edge 28 of the outer platform 44 as shown in FIGS. 9 and 10. The vent passages 64 are configured to cause gas flowing into the channel 65 from the vent passages 64 to swirl in the channel and ensure an even circumferential pressure distribution, which may provide a minimum sealing flow radially outward of the gas path 18. The minimum sealing flow may ensure an even circumferential pressure distribution, which enables a minimum outward to gas path sealing flow.

Figure 11:
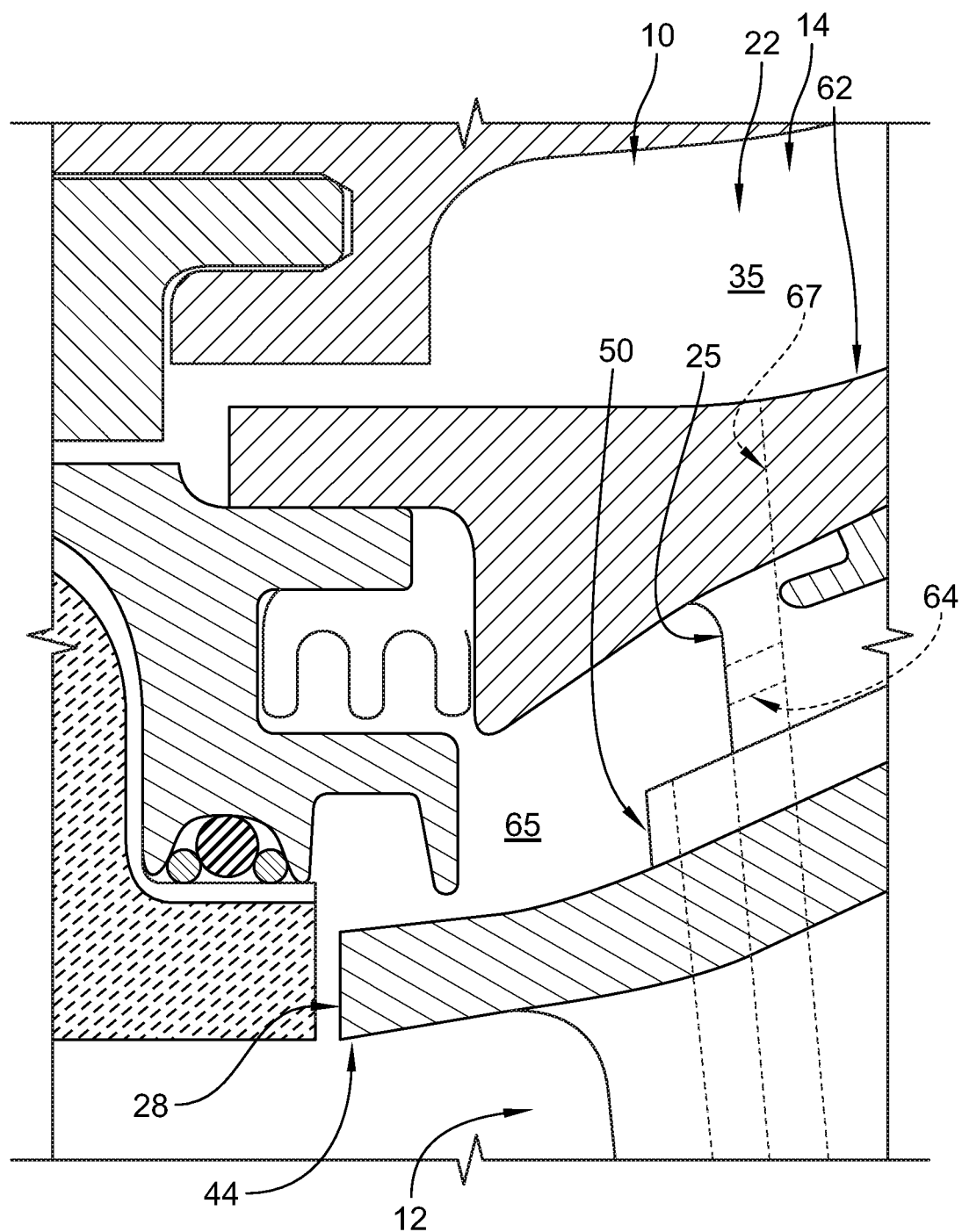
FIG. 11 is a detail view of the another embodiment of the turbine vane assembly of FIG. 8 showing the carrier defines a radially inwardly opening channel arranged along a leading edge of the outer platform of the turbine vane and a plurality of vent passages that extend through the support spar and open into the radially inwardly opening channel to cause gas flowing into the channel from the vent passages to swirl in the channel and ensure an even circumferential pressure distribution which enables a minimum outward to gas path sealing flow.

In other embodiments, the vent passages 64 may be formed in the support spar 24, 25 of the outer vane support 14 as suggested in FIG. 11. The vent passages 64 may extend through the support spar 24, 25 to fluidly couple a cooling channel 67 formed in the support spar 24, 25 to the channel 65 so that air may be supplied to the channel 65.

Figure 3:
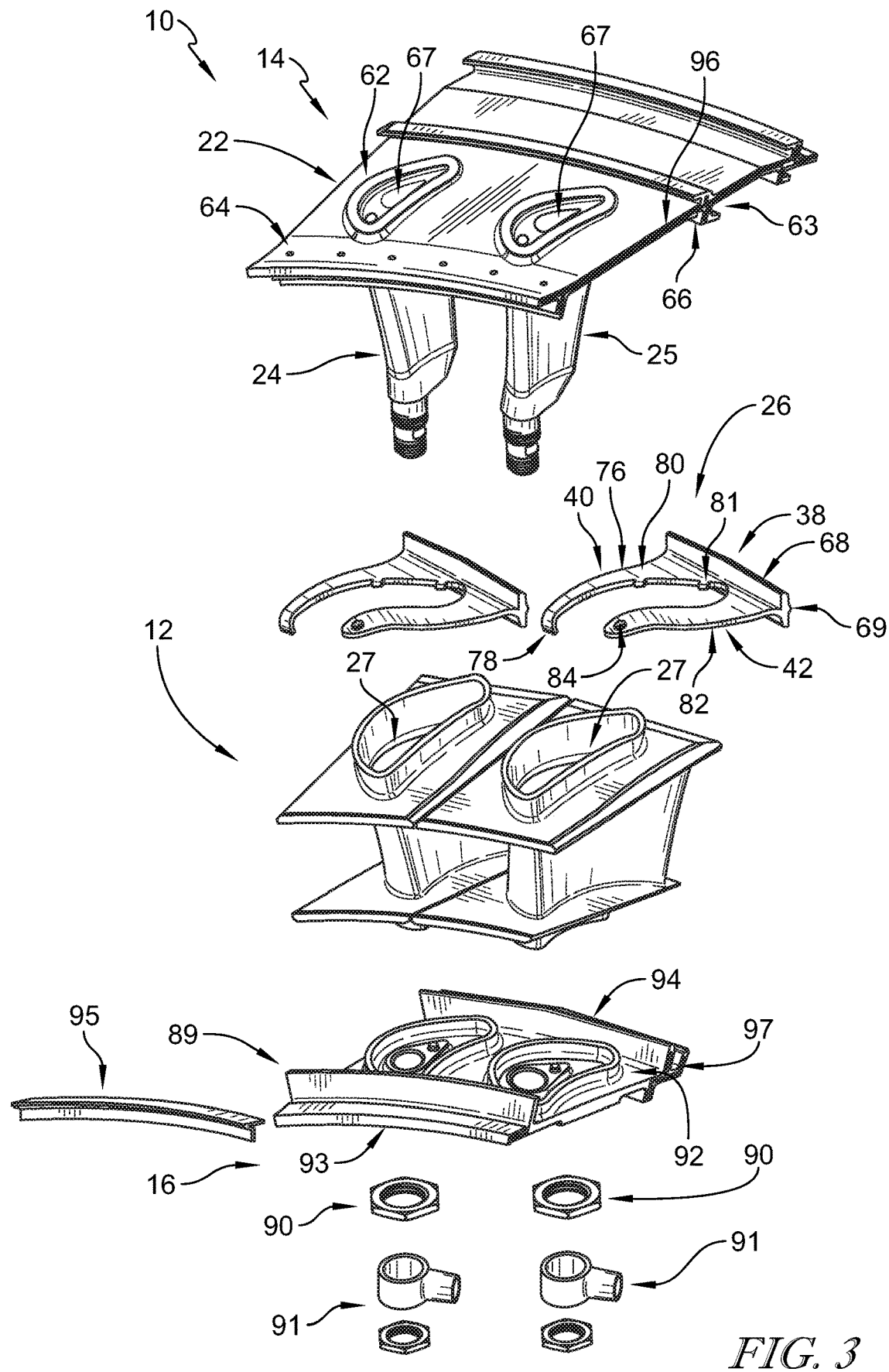
FIG. 3 is an exploded view of the turbine vane assembly of FIG. 1 showing the outer vane support includes the carrier that extends partway about the axis of the gas turbine engine, a support spar that extends radially inward of the outer carrier through the vane and couples to the inner vane support, the chordal seals arranged between the carrier and an outer mounts of the turbine vane, and the inner vane support.
Figure 5:
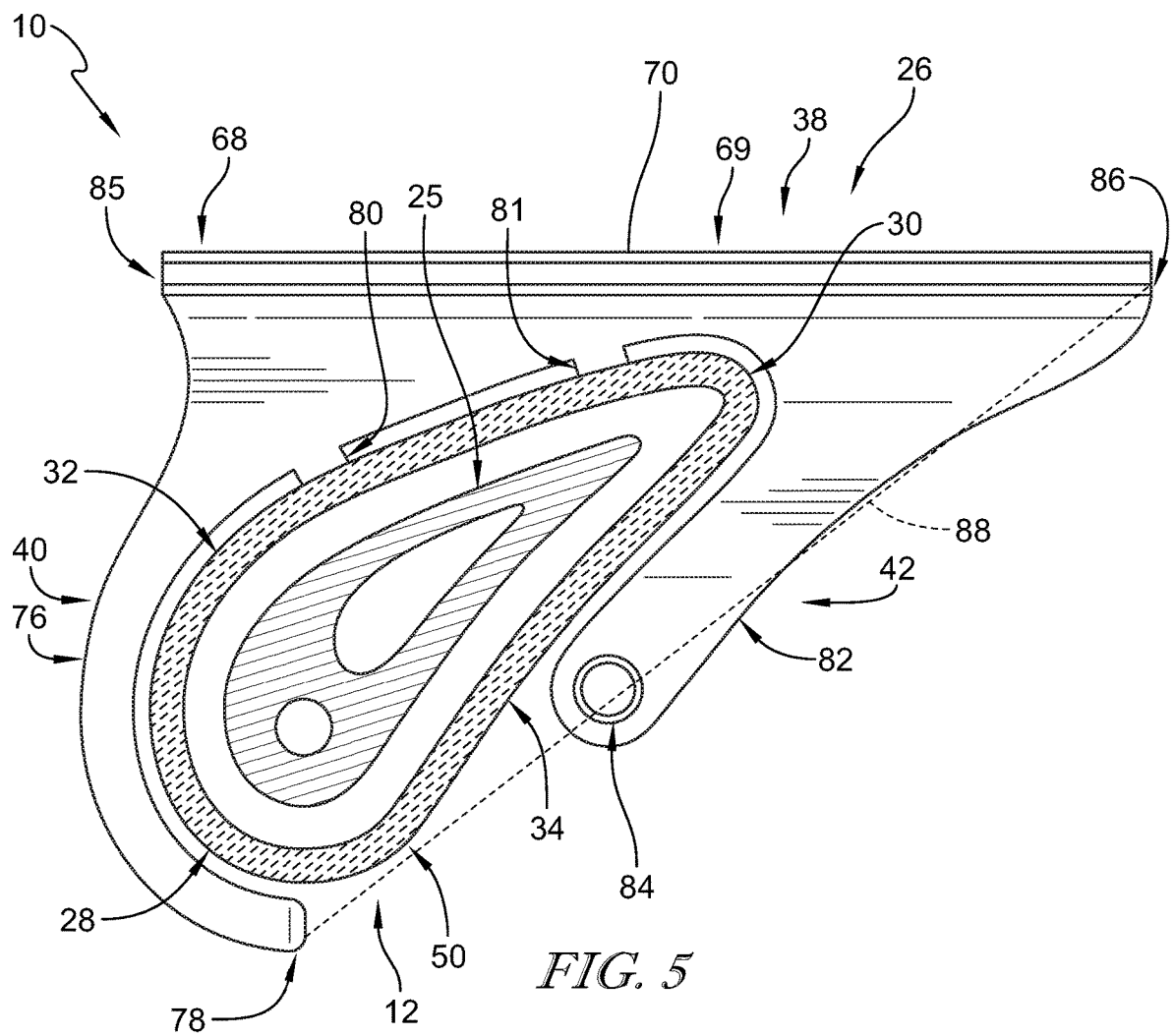
FIG. 5 is a cross-sectional view of the turbine vane assembly of FIG. 2 showing the first arm of the chordal seal extends partway around a suction side of the outer mount of the vane and the second arm extends partway around a pressure side of the outer mount of the vane opposite the first arm, and further showing the first arm is shaped to include a first engagement member that extends radially from the first arm to engage the outer carrier and drive engagement of the chordal seal with the vane.

The band 38 includes a body 68 and a rib 69 as shown in FIGS. 3-5. The body 68 is coupled with the first arm 40 and the second arm 42. The rib 69 extends circumferentially along the body 68 and axially outward away from the body 68 to engage the carrier 22. The rib 69 forms an axially facing surface 70 that engages the carrier 22, while the body 68 of the band 38 has a radially inward facing surface 72 that engages the outer platform 44 along the outer chordal sealing surface 56 at the trailing edge 30 of the outer platform 44 to restrict the gas flow between the carrier 22 and the outer platform 44 of the vane 12.

In the illustrative embodiment, the radially inward facing surface 72 of the band 38 forms a tip 74 as shown in FIGS. 4 and 7. The tip 74 is located forward of an axial midpoint 75 of the band 38.

In the illustrative embodiment, a portion of the band 38 is received in the cavity 66 and the axially facing surface 70 of the band 38 engages the lip 63 as shown in FIGS. 9 and 10. The lip 63 is sized to allow the axially facing surface 70 of the band 38 to slide radially inwardly and outwardly relative to the axis 11 along the lip 63 to maintain engagement of the band 38 and the lip 63 during use of the turbine vane assembly 10.

During use of the turbine vane assembly 10 in the gas turbine engine 110, the difference in coefficients of thermal expansion between the ceramic materials of the vane 12 and the metallic materials of the outer vane support 14 may cause the components to move and vary a radial distance of the gap in which the chordal seal 26 is located as suggested in FIGS. 10 and 11. Such movement causes the second arm 42 of the chordal seal 26 to elastically deform. The deformation of the arm 42 urges that radially inward facing surface 72 into engagement with the outer chordal sealing surfaced 56 and maintain the seal between the carrier 22 and the vane 12.

In some embodiments, the first arm 40 is stiffer than the second arm 42. As such, the second arm 42 elastically deforms upon engagement with the carrier 22, while the first arm 40 engages the vane 12. In other embodiments, the first arm 40 and the second arm 42 both elastically deform to maintain engagement of the radially inward facing surface 72 with the outer chordal sealing surfaced 56 and seal between the carrier 22 and the vane 12.

The first arm 40 includes an axially extending flange 76, a first engagement member 78, and a plurality of load pads 80, 81 as shown in FIGS. 3-5. The first engagement member 78 extends radially from the flange 76 and engages the outer platform 44 of the vane 12. The load pads 80 extend away from the flange 76 and engage the suction side 32 of the outer mount 50 to transfer aerodynamic loads applied to the vane 12 to the chordal seal 26.

Figure 8:
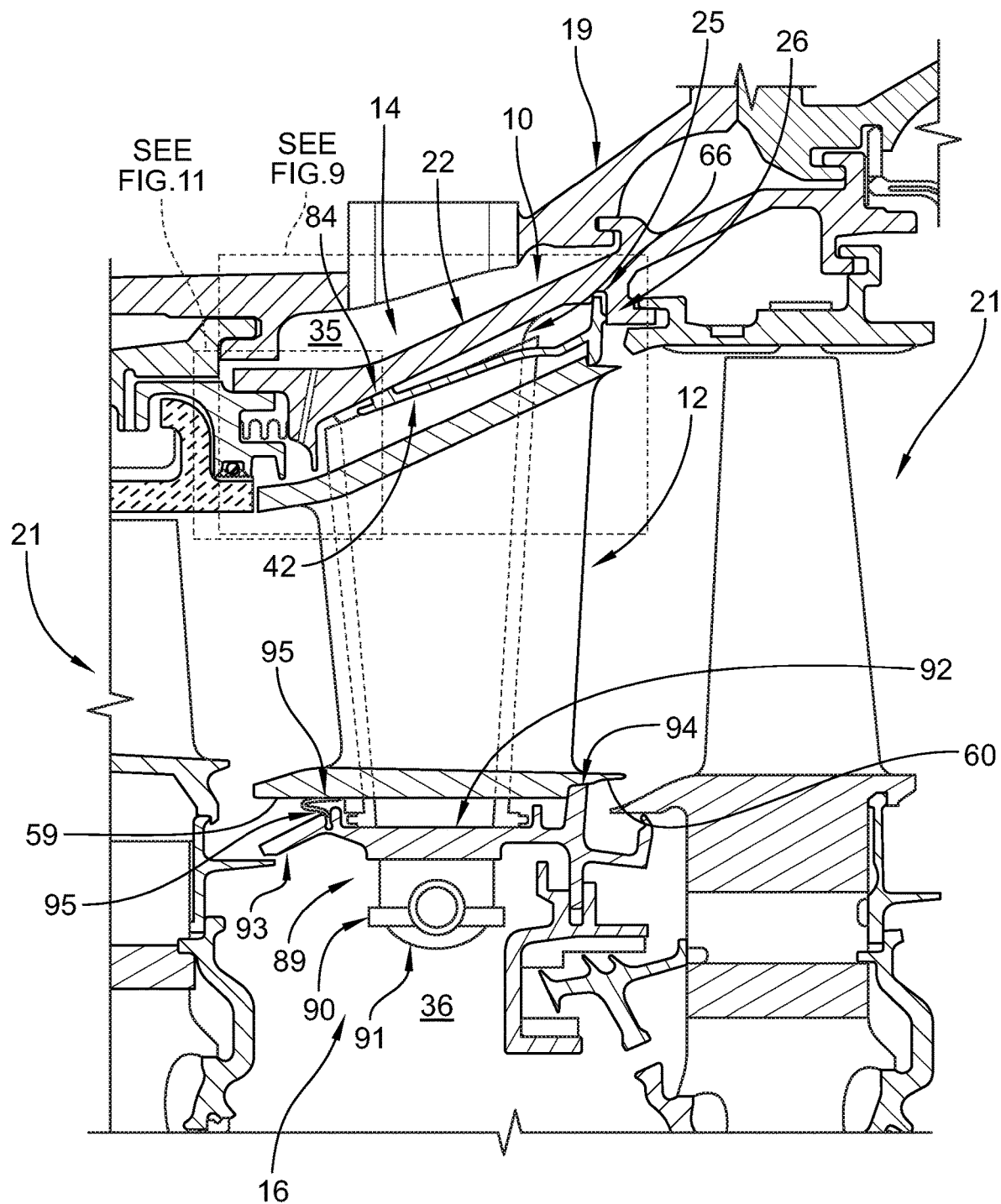
FIG. 8 is a section view of a portion of the turbine included in the gas turbine engine of FIG. 1 showing the turbine vane assembly of FIG. 2 and portions of the turbine casing and rotating wheel assemblies.

The second arm 42 includes an axially extending flange 82 and a second engagement member 84 as shown in FIGS. 6-8. The second engagement member 84 extends radially from the flange 82 and engages the carrier 22.

In the illustrative embodiment, the band 38 extends circumferentially from a first end 85 to a second end 86 as shown in FIGS. 4 and 5. An imaginary line 88 extends from the second end 86 of the band 38 to the first engagement member 78 as shown in FIG. 5. The second engagement member 84 is located on the imaginary line 88 in the illustrative embodiment. In other embodiments, the second engagement member 84 may be located near the imaginary line 88 depending on the envelope defined by the imaginary line 88. In some embodiments, the second engagement member 84 may be located within the imaginary line 88, or in other words, the second engagement member 84 may be substantially located between the outer mount 50 and the imaginary line 88. Such placement of the second engagement member 84 may help prevent tipping of the chordal seal 26.

Turning again to the inner vane support 16, the inner vane support 16 includes an inner carrier 89, fasteners 90, and nozzles 91 as shown in FIGS. 2-7. The inner carrier 89 extends at least partway about the axis 11. Each of the nozzles 91 are coupled to an inner end of each support spars 24, 25 that extends through the inner carrier 89. Each of the fasteners 90 couples the inner end of each support spar 24, 25 to the inner carrier 89.

The inner carrier 89 includes an inner mount platform 92, a forward diagonal arm 93, and an aft chordal band 94 as shown in FIGS. 3 and 8. The inner mount platform 92 extends at least partway about the axis 11. The forward diagonal arm 93 extends axially forward from and circumferentially along the inner mount platform 92 along the leading edge 28 of the platform 92. The aft chordal band 94 extends radially outward from and circumferentially along the inner mount platform 92.

In the illustrative embodiment, the forward diagonal arm 93 interfaces the forward turbine wheel assembly 21 at the leading edge 28 of the vane 12, while the aft chordal band 94 engages the inner chordal sealing surface 60 of the inner platform 46 of the vane 12 at the trailing edge 30 of the vane 12. The forward diagonal arm 93 and the aft chordal band 94 together help seal the turbine vane 12 at the radially inner end of the vane 12. The band 38 engages the chordal sealing surface 60 along a linear path in the illustrative embodiment.

In the illustrative embodiment, the inner carrier 89 further includes a leading edge seal 95 as shown in FIG. 8. The forward diagonal arm 93 is shaped to couple the leading edge seal 95 to the inner mount platform 92. The leading edge seal 95 extends between the inner carrier 89 and the outer surface 59 of the inner platform 46.

In the illustrative embodiments, the carrier 22 and the inner carrier 89 are both shaped to include strip seal grooves 96, 97 as shown in FIG. 3. The strip seal grooves 96, 97 are configured to receive strip seals that are also received in the strip seal grooves 96, 97 in adjacent turbine vane assemblies 10 in the gas turbine engine 110. The strip seal grooves 96, 97 help seal between the adjacent turbine vane assemblies 10.

The present disclosure relates to reducing the rotation of ceramic matrix composite vanes 12 and metallic vane support structures 14, 16 in a turbine vane assembly 10 by mechanically linking adjacent metallic support spars 24, 25. The reduction in rotation may be leveraged to reduce secondary air system leakage and improve overall engine performance.

In metallic turbine vane embodiments, the turbine vane may include rigidly coupled choral seals to seal the interface radially outward and radially inward of the turbine vane at the trailing edge 30. However, in ceramic turbine vane 12 embodiments, such rigidly coupled choral seals may not effectively seal at the trailing edge 30 due to the difference in coefficients of thermal expansion between the ceramic matrix composite materials of the turbine vane 12 and the metallic materials of the support structure 14. As such, the present disclosure teaches a chordal seal 26 arranged between a carrier 22 of the outer vane support 14 and the vane 12 and configured to deform in response the thermal expansion of the components to maintain sealing at the trailing edge 30 of the vane 12.

In some embodiments, the non-gas path side of turbine vane 12 may be pressurized to a uniform static pressure. Often, this pressurization may be greater than the maximum pressure experienced on the gas path side of the vane 12 to prevent hot gas ingress. This creates a small pressure gradient between the sealing fluid or pressurizing fluid and the working fluid at the leading edge 28 of the vane 12.

The turbine vane 12 is configured to guide and accelerate the working fluid toward the downstream turbine blade 15. The directing of the working fluid results in a reduction of static pressure from the leading edge 28 to the trailing edge 30 of the vane 12. The reduction in static pressure causes the small pressure gradient at the leading edge 28 of the vane 12 to become a large pressure gradient at the trailing edge 30. In some embodiments, the pressure may reduce by about 30 to 50 percent. In other embodiments, the pressure may reduce by about 30 to 60 percent. Therefore, effective sealing at the trailing edge 30 of the turbine vane 12 may be desired to improve engine performance.

In some embodiments, rigid chordal seals may be used at the trailing edge 30 of a metallic turbine vane, as choral seals are effective and have a long life cycle. However, ceramic matrix composite components have a lower coefficient of thermal expansion compared to the metallic support structure 14, which may cause issues with maintaining effective sealing without large stresses.

Therefore, the chordal seal 26 is configured to elastically deform and maintain sealing between the vane 12 and the carrier 22. By clamping the chordal seal 26 and the vane 12 between the outer and inner vane supports 14, 16, the chordal seal 26 is able to elastically deform and maintain sealing between the chordal seal 26 and the vane 12. At the same time, the elastic deformation of the chordal seal 26 also eliminates or reduces the relative movement at the interface of the chordal sealing surface 56 and the radially inward facing surface 72 by driving the relative movement caused by thermal expansion through the elastic deformation of the arm 42 of the chordal seal 26. In this way, sealing at this interface is maintained, while the stress in the ceramic matrix composite vane 12 caused by a rigid contact between the surfaces 56, 72 is minimized.

In the illustrative embodiments, the outer vane support 14 includes outer cavity ventilation with sealing flows transmitted through swirled holes 64 in the carrier 22. The front discourager radial clearance is sized for no significant pressure drop to ensure known pressure in the cavity 35 internal to the vane 12 as shown in FIGS. 9 and 10. A swirled cavity 65 between discouragers is configured to minimize circumferential pressure variation.

In the illustrative embodiment, the support spars 24, 25 are hollow and shaped to include the cooling channel 67 that extends radially through the spar 24, 25 as shown in FIG. 3. The cooling channel 67 may be supplied a flow of cooling air that is transmitted to the vane 12 in the interior cavity 27 via impingement holes formed in the support spar 24, 25. In the illustrative embodiment, the cooling channel 67 of the support spar 24, 25 is open to high-pressure pipe delivery. In some embodiments, the cooling channel 67 of the support spar 24, 25 may be open for ducted flow within the case 19 (i.e. through metering holes formed in an upstream component).

In the illustrative embodiments, the inner support structure 16 includes inner cavity ventilation with sealing flows transmitted through swirled holes in the inner carrier. The transfer passage through the spar blends into circular 12 mm diameter passing through the inner carrier. The flows then turn through the flow nozzle. The flow nozzle may be formed using several different manufacture methods, such as casting, additive layer manufacturing, metal injection molding, binder jetting, and/or machining.

In the illustrative embodiment, the turbine vane assembly 10 includes a pair of chordal seal surfaces 56, 60 formed in the ceramic matrix composite turbine vane 12. One of the chordal sealing surfaces 56 is arranged at the trailing edge 30 radially outward of the gas path 18 on the outer platform 44. The other chordal sealing surface 60 is arranged at the trailing edge 30 radially inward of the gas path 18 on the inner platform 46.

In the illustrative embodiment, the chordal sealing surfaces 56, 60 are flat and do not follow the engine curvature. The chordal sealing surfaces 56, 60 may be machined and/or polished to create a sealing surface with minimized roughness (i.e. a roughness of about 1.6 micron Ra or less in some embodiments). In some embodiments, local thickening of the ceramic matrix composite material with additional fibre plies and/or matrix material may be added to mitigate the thin-wall section at mid-circumference of the turbine vane 12.

In some embodiments, the chordal sealing surfaces 56, 60 may be coated with a protective coating to minimize the interaction between the metallic materials of the chordal seal 26 or aft chordal band 94 and the ceramic matrix composite materials of the vane 12. In other embodiments, the radially inwardly facing surface 72 of the chordal seal 26 as well as the art chordal band 94 may be coated with such a protective coating to minimize chemical interaction.

In some embodiments, chordal seal 26, 94 may be most effective when a line contact along the length of the seal is maintained. Therefore, planar surfaces may enable the most effective sealing without thermal distortion and/or mechanical deflections influencing the sealing effectiveness.

In some embodiments, the metallic seal face or radially inward facing surface 72 may be rounded i.e. circular cross section. In the illustrative embodiment, the radially inward facing surface 72 forms the tip 74.

In some embodiments, the line contact may be biased as far forwards as possible in an effort to minimize the gap between the chordal seal surface 56 and the radially inward facing surface 72. In the illustrative embodiment, the tip 74 is located axially forward of the axial midpoint 75 of the band 38 to minimize leakage underneath the surface 72.

In the illustrative embodiment, the turbine vane assembly 10 includes radially restraining and sealing the ceramic matrix composite components and axially restraining and sealing the metallic components. The radial restraints may include radially restraining the carrier 22 to the turbine case 19, radially reacting the chordal seal 26 between the carrier 22 and the outer platform 44 to provide a pre-load to the vane 12, and radially reacting at the inner platform 46 forming line contact with inner carrier 89 i.e. pushed onto the inner carrier 89 by the pre-load.

In some embodiments, the outer platform 44 forms a radial retention at the line contact with carrier 22 at trailing edge 30. Additionally, the second arm 42 may contact a patch of the outer platform 46 towards leading edge 28.

The axial restraints may include transferring the aerodynamic loads onto the chordal seal 26 and biasing the chordal seal 26 rearwards and circumferentially. The axial restraints may further include axial reaction of chordal seal 26 with the carrier 22 in the cavity 66.

In the illustrative embodiment, the inner carrier 89 includes a fixed radial sealing interface as shown in FIG. 8. In a double span metallic support arrangement, the sealing interfaces or chordal bands 94 must be unique to each ceramic vane 12. For instance, the planar contact may be on a unique axis to minimise machining requirements on the vane 12. The interface of the chordal band 94 may be machined and/or polished to create a sealing surface with minimised roughness i.e. equal to or better than 1.6 micron Ra in some embodiments.

In some embodiments, the chordal seal 26 may have a high stiffness load transfer arm 40 that includes load pads 80, 81 as shown in FIG. 4. In such embodiments, the axial load imparted on the vane 12 may be transmitted into the load pads 80, 81 which in turn engages the axial chordal seal 26 onto an axial face of the lip 63

In some embodiment, the turbine vane assembly 10 may include a cross-key pin. The pin may extend through a portion of the band 38 of the chordal seal 26 in the cavity 66. The pin may be configured to anti-rotate or block circumferential rotation of the chordal seal 26 in the cavity 66 while permitting radial movement of the chordal seal 26 relative to the carrier 22.

In the illustrative embodiment, the pre-load may be applied to the vane 12 by elastically deforming the arms 40, 42 during initial assembly of the turbine vane assembly 10. The arms 40, 42 may be elastically deformed by tightening a nut retaining the inner carrier 89. The tightening of the nut may deflect the arms 40, 42 which will change the radial load reacted onto the carrier 22 and outer platform 44.

In some embodiments, the pre-load may be tailored to achieve a desired pre-load during initial assembly, a desired radial load across flight cycle onto outer platform 44, a desired stress within chordal seal 26, and/or a desired pre-load across full range of manufacturing/assembly tolerances. In some embodiments, varying the pre-load may also allow for a desired stress in the ceramic matrix composite vane 12, both in-plane and through thickness. In some embodiments, varying the per-load may allow for maximized sealing performance across flight cycle.

It may also allow for a desirable creep performance and/or sealing performance reduction through the life of the components. As creep capability may be important to retain sealing performance, the chordal seal 26 may be manufactured from a high temperature nickel alloy.

The reaction of aerodynamic loading into the chordal seal 26 may be purely axial if properly aligned or alterative include a circumferential component. In embodiments where the aerodynamic loading is only axial, the circumferential loading may be transferred independently. In other embodiments, a proportion of the load may be transmitted though alterative features, as long as sufficient reaction is achieved to adequately seal the axial chordal seal.

In some embodiments, one load transfer feature may be a pin rather than load pads 80, 81. The pin may extend through a portion of the arm 40 into the vane 12 and support spar 25 to transmit the load.

In some embodiments, inner and outer chordal seals may be on parallel planes. However, in other embodiments, the outer line contact may be inclined relative to the inner line contact at the inner carrier 89.

In some embodiments, material may be added to the platforms 44, 46 to avoid creating an even thinner wall section in the platform 44, 46 at mid-circumference. The thickening of the platforms 44, 46 may bias the vane 12 onto the load pads 80, 81 (i.e. a small component of the radial pre-load may be translated into a reaction that biases the vane 12). Such an arrangement may alleviate some of the coefficient of thermal expansion mismatch between the ceramic vane 12 and metallic support structure 14. In some embodiments, the chordal seal 26 may also help stabilize the vane 12 when there is no pressure loading on the vane 12.

In the illustrative embodiment, the chordal seal 26 may improve sealing performance and deterioration at the trailing edge 30 of the ceramic vane 12. The chordal seal 26 may also offer a simple seal that may be optimized with thermo-mechanical analysis.

In the illustrative embodiment, the chordal seal 26 may also provide the ability to tailor the pre-load and relative deflections of the vane 12 to improve sealing effectiveness and adjust stresses. The chordal seal 26 may also lower the part count by integrating multiple functionalities into existing parts. Therefore, the chordal seal 26 may also allow the turbine vane assembly 10 to be relatively easy to assemble/dis-assemble.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly for use in a gas turbine engine comprises
   a carrier comprising metallic materials, the carrier extending circumferentially at least partway about an axis,
   a vane comprising ceramic matrix composite materials and adapted to interact with gases flowing through a gas path of the gas turbine engine, the vane including an outer platform that defines an outer boundary of the gas path, an inner platform spaced apart radially from the outer platform to define an inner boundary of the gas path, an airfoil that extends radially between the outer platform and the inner platform, and an outer mount that extends radially away from the outer platform, and
   a chordal seal comprising metallic materials and located radially between the carrier and the vane to restrict gas flow between the carrier and the vane, the chordal seal including a radially upright band, a first arm that extends axially forward away from the band and partway around the outer mount of the vane, and a second arm that extends axially forward away from the band and partway around the outer mount of the vane opposite the first arm,
   wherein an axially facing surface of the band engages the carrier and a radially inward facing surface of the band engages the outer platform along a linear path to restrict the gas flow between the carrier and the outer platform of the vane, and
   wherein the first arm engages the outer platform, the second arm engages the carrier, and the first arm is elastically deformed to urge the band radially inward toward the outer platform and maintain contact of the radially inward facing surface with the outer platform during use of the turbine vane assembly.

2. The turbine vane assembly of claim 1, wherein the first arm includes a flange that extends axially away from the band and a plurality of load pads that extend away from the flange and engage a suction side of the outer mount.

3. The turbine vane assembly of claim 1, wherein the band includes a body coupled with the first arm and the second arm and a rib that extends circumferentially along the body and axially outward away from the body to engage the carrier.

4. The turbine vane assembly of claim 1, wherein the first arm and the second arm are shaped to have a contour that corresponds with a contour of the outer mount.

5. The turbine vane assembly of claim 1, wherein the outer platform has a leading edge that extends circumferentially relative to the axis and a trailing edge that extends circumferentially relative to the axis, a radially outward facing surface of the outer platform at the trailing edge extends circumferentially along a straight path without curving about the axis, and the radially inward facing surface of the band engages the radially outward facing surface at the trailing edge.

6. The turbine vane assembly of claim 5, wherein the radially inward facing surface of the band forms a tip and the tip is located forward of an axial midpoint of the band.

7. The turbine vane assembly of claim 1, further comprising an inner chordal seal arranged radially inward of the vane, the inner chordal seal including an inner mount platform that extends partway about the axis and a chordal band that extends radially outward from the inner mount platform and engages the inner platform of the vane along a linear path to restrict the gas flow between the inner mount platform and the inner platform of the vane into the interior cavity of the vane.

8. The turbine vane assembly of claim 1, wherein the carrier defines a radially inwardly opening channel arranged along a leading edge of the outer platform and a plurality of vent passages that extends radially inwardly and circumferentially through the carrier and open into the radially inwardly opening channel to cause gas flowing into the channel from the plurality of vent passages to swirl in the channel and ensure an even circumferential pressure distribution, which enables a minimum outward to gas path sealing flow.

9. The turbine vane assembly of claim 1 wherein the first arm includes an axially extending flange and a first engagement member that extends radially from the flange, the second arm includes an axially extending flange and a second engagement member that extends radially from the flange, the band extends circumferentially from a first end to a second end, an imaginary line extends from the second end of the band to the first engagement member, and the second engagement member is located on the imaginary line.

10. The turbine vane assembly of claim 1, wherein the carrier includes an outer wall that extends circumferentially and a lip that extends radially inward from the outer wall relative to the axis, the axially facing surface of the band engages the lip and the lip is sized to allow the axially facing surface of the band to slide radially inwardly and outwardly relative to the axis along the lip to maintain engagement of the band and the lip during use of the turbine vane assembly.

11. A turbine vane assembly for use in a gas turbine engine comprises
a carrier that extends circumferentially at least partway about an axis,
a vane including an outer platform, an inner platform spaced apart radially from the outer platform to define a gas path of the gas turbine engine, an airfoil that extends radially between the outer platform and the inner platform, and an outer mount that extends radially away from the outer platform, and
a chordal seal located radially between the carrier and the vane, the chordal seal including a band, a first arm that extends axially forward away from the band and partway around the outer mount of the vane, and a second arm that extends axially forward away from the band and partway around the outer mount of the vane opposite the first arm,
wherein an axially facing surface of the band engages the carrier and a radially inward facing surface of the band engages the outer platform along a linear path, and
wherein the first arm engages the outer platform, the second arm engages the carrier, and the first arm is elastically deformed to urge the band radially inward toward the outer platform and maintain contact of the radially inward facing surface with the outer platform.

12. The turbine vane assembly of claim 11, wherein the band includes a body coupled with the first arm and the second arm and a rib that extends circumferentially along the body and axially outward away from the body to engage the carrier.

13. The turbine vane assembly of claim 12, wherein the first arm includes a flange that extends axially away from the band, a first engagement member that extends radially from the flange and engages the outer platform of the vane, and a plurality of load pads that extend away from the flange and engage a suction side of the outer mount.

14. The turbine vane assembly of claim 13, wherein the second arm includes a flange that extends axially away from the band and a second engagement member that extends radially from the flange and engages the carrier, and wherein the band extends circumferentially from a first end to a second end such that an imaginary line extends from the second end of the band to the first engagement member, and the second engagement member is located on the imaginary line.

15. The turbine vane assembly of claim 11, further comprising an inner chordal seal arranged radially inward of the vane, the inner chordal seal including an inner mount platform that extends partway about the axis and a chordal band that extends radially outward from the inner mount platform and engages the inner platform of the vane along a linear path to restrict a gas flow between the inner mount platform and the inner platform of the vane into the interior cavity of the vane.

16. The turbine vane assembly of claim 15, wherein each of the outer platform and the inner platform has a leading edge that extends circumferentially relative to the axis and a trailing edge that extends circumferentially relative to the axis, and wherein each of the outer platform and the inner platform include a chordal sealing surface at the trailing edge that faces opposite the gas path and extends circumferentially along a straight path without curving about the axis.

17. The turbine vane assembly of claim 16, wherein the radially inward facing surface of the band engages the chordal sealing surface of the outer platform, and wherein the chordal band of the inner chordal seal engages the chordal sealing surface of the inner platform.

18. A method comprising,
providing a carrier, a vane, and a chordal seal, the carrier including an outer wall that extends circumferentially partway about an axis and a spar that extends radially inward from the outer wall, the vane including an outer platform, an inner platform spaced apart axially from the outer platform relative to the axis, an airfoil that extends radially between and interconnects the outer platform and the inner platform, and a vane mount that extends radially away from the outer platform, and the chordal seal including a band, a first arm that extends axially forward away from the band, and a second arm that extends axially forward away from the band, arranging the chordal seal around the vane mount of the vane so that the first arm of the chordal seal extends around a suction side of the vane mount of the vane and the second arm of the chordal seal extends around a pressure side of the vane mount of the vane, arranging the vane mount of the vane radially inward of the carrier, engaging the first arm of the chordal seal with the outer platform of the vane to cause the first arm to elastically deform and urge the band of the chordal seal radially inward toward engagement with the outer platform.

\* \* \* \* \*